(12) United States Patent
Takamizawa et al.

(10) Patent No.: US 6,474,872 B2
(45) Date of Patent: Nov. 5, 2002

(54) BALL BEARING

(75) Inventors: Toru Takamizawa, Kanagawa (JP);
Mamoru Aoki, Kanagawa (JP);
Takayuki Miyagawa, Kanagawa (JP);
Hiroshi Ishiwada, Kanagawa (JP);
Hirotoshi Aramaki, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/977,191

(22) Filed: Oct. 16, 2001

(65) Prior Publication Data

US 2002/0118900 A1 Aug. 29, 2002

(30) Foreign Application Priority Data

Oct. 16, 1999 (JP) ..................................... P2000-314999

(51) Int. Cl.[7] .............................................. F16C 33/58
(52) U.S. Cl. ...................... 384/516; 384/513; 384/450
(58) Field of Search ................. 384/513, 516, 384/450

(56) References Cited

U.S. PATENT DOCUMENTS

| | | | | |
|---|---|---|---|---|
| 3,619,017 A | * | 11/1971 | Robinson et al. | 384/513 |
| 3,647,268 A | * | 3/1972 | Haines | 384/516 |
| 4,664,535 A | * | 5/1987 | Mottate | 384/45 |
| 4,696,588 A | * | 9/1987 | Tanaka et al. | 384/615 |
| 5,051,004 A | * | 9/1991 | Takeuchi et al. | 384/512 |
| 5,234,272 A | * | 8/1993 | Shimada | 384/450 |
| 5,427,458 A | * | 6/1995 | Sanchez | 384/450 |
| 5,501,530 A | * | 3/1996 | Nagai et al. | 384/516 |
| 6,152,605 A | * | 11/2000 | Takemura et al. | 384/462 |
| 6,176,805 B1 | * | 1/2001 | Itoh et al. | 384/450 |
| 2001/0028754 A1 | * | 10/2001 | Ishiguro et al. | 384/516 |

* cited by examiner

*Primary Examiner*—David A. Bucci
*Assistant Examiner*—Julie K. Smith
(74) *Attorney, Agent, or Firm*—Sughrue Mion, PLLC

(57) ABSTRACT

In the ball bearing, the ratio of the radius of curvature of an inner race raceway 4 to the outside diameter of balls 8, 8 is set in the range of 0.51 to 0.54. Also, the ratio of the radius of curvature of an outer race raceway 6 to the outside diameter of balls 8, 8 is set in the range of 0.54 to 0.56. Further, an interior geometric clearance c is set at 13 μm or less. Thanks to these specifications, the balls 8, 8 can be prevented from running up onto the edge of the outer race raceway 6.

3 Claims, 8 Drawing Sheets

BALL BEARING

BACKGROUND OF THE INVENTION

The present invention relates to a ball bearing for supporting a spindle which is incorporated into a hard disk drive unit (HDD), a video tape recorder (VTR), or a digital audio tape recorder (DAT) and can be rotated at a high speed.

Figure 1:
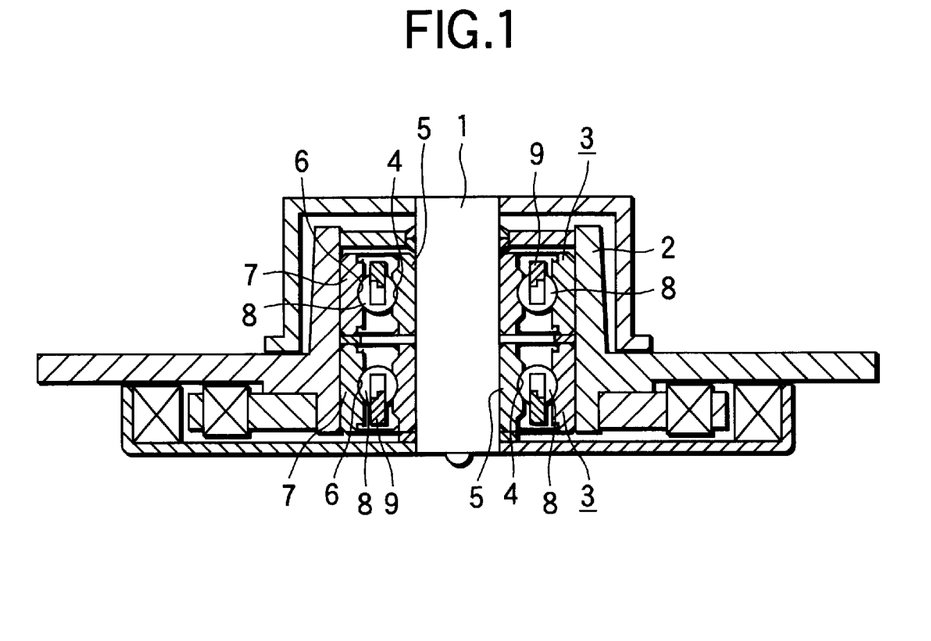
FIG. 1 is a section view of a motor for HDD incorporating therein a ball bearing according to the invention.

For example, in the case of an HDD to be incorporated into a computer, such a drive motor as shown in FIG. 1 is incorporated into the HDD and is used to drive and rotate a spindle 1 which is used to drive the HDD. Between the outer peripheral surface of the spindle 1 and the inner peripheral surface of a housing 2, there are interposed a pair of ball bearings 3, 3. Each of the bearings has such a structure as shown in detail in FIG. 2. The ball bearings 3, 3 support the spindle 1 on the inside of the housing 2 in such a manner that the spindle 1 can be rotated freely. Each of the ball bearings 3, 3 comprises a steel-made inner race 5, a steel-made outer race 7 and a plurality of steel-made balls 8, 8. The steel-made inner race 5 has an inner race raceway 4 formed on the outer peripheral surface thereof. The steel-made outer race 7 has an outer race raceway 6 formed on the inner peripheral surface thereof. The plurality of steel-made balls 8, 8 are rotatably interposed between the inner race and outer race raceways 4 and 6. A retainer 9 rotatably retains these balls 8, 8. While the balls 8, 8 are assembled to the drive motor, they are given preloads to thereby prevent them from playing when the spindle 1 is rotated.

In the case of the above-structured ball bearing 3 to be incorporated into the rotation support portion of the HDD, in view of the fact that it is used in the house interior, the ball bearing 3 is requested to be able to minimize the noises that are produced while it is in operation. In addition, at the same time, due to the enhanced density (increased storage capacity) and reduced size of the HDD in recent years, the ball bearing is requested to be able to minimize vibrations such as NRRO (Rotation asynchronous vibration). On the other hand, due to spread of OA equipment such as a notebook computer, in order to prevent trouble caused by impact loads that could be generated when the OA equipment is dropped because of wrong handling, the ball bearing 3 is further requested to be strong (impact-resistant) against the impact loads.

In order to enhance the impact resistance of the ball bearing 3 for this purpose, conventionally, there is known a technique to reduce the ratio of the radiuses of curvature of the inner race raceway 4 and outer race raceway 6 to the radiuses of curvature of the rolling surfaces of the respective balls 8, 8. (That is, there is known a technique to set the ratio of the radiuses of curvature of the inner race raceway 4 and outer race raceway 6 to the radiuses of the outside diameters of the respective balls 8, 8 slightly larger than 0.5).

Namely, the ratio of the radiuses of curvature of the inner race raceway 4 and outer race raceway 6 to the radiuses of curvature of the rolling surfaces of the respective balls 8, 8 are reduced. Contact ellipses existing on the contact portions between the raceways 4, 6 and balls 8, 8 are therefore increased in size, to thereby lower the surface pressures of these contact portions. Accordingly, even the above impact loads are not be able to produce such impressions in the raceways 4, 6 that give rise to the above-mentioned vibrations.

However, a test conducted by the inventors et al. shows that, in case where the ratio of the radiuses of curvature of the inner race raceway 4 and outer race raceway 6 to the radiuses of curvature of the rolling surfaces of the respective balls 8, 8, is reduced, the rotation torque of the ball bearing 3 is increased. At that time, as a result of this, not only the power consumption of the OA equipment incorporating such ball bearing 3 therein is increased but also the ball bearing 3 is not be able to offer sufficient impact resistance. In other words, our test shows that, in case where the above-mentioned ratio of the radiuses of curvature is reduced, the static load rating increases but the impact resistance cannot be always enhanced. For example, when the inventors et al. conducted a drop test in conformity to a case where compact OA equipment is dropped, in the case of the ball bearing with the radius of curvature ratio reduced, the acoustics of the ball bearing were degraded. It is believed that such degraded acoustics were caused by the impressions formed after the OA equipment was dropped down onto the floor.

Specifically, as to the reason why such impressions were produced, the inventors believed as follows. In the case of the ball bearing 3 with the radius of curvature ratio reduced, the rolling surfaces of the balls 8, 8 are easy to run onto the shoulders of the inner race raceway 4 and outer race raceway 6 due to the impact load applied to the ball bearing 3. Further, in case where the rolling surfaces of the balls 8, 8 run onto the raceway shoulders, impressions are produced on the rolling surfaces of the balls 8, 8 due to excessive surface pressures caused by edge loads.

SUMMARY OF THE INVENTION

In view of the above, the inventors conceived that, by increasing the above-mentioned radius of curvature ratio as well as by reducing an interior geometric clearance, there can be realized a ball bearing 3 having a following feature. That is, in the ball bearing 3, the rolling surfaces of the balls 8, 8 can be made hard to run onto the shoulders of the inner race raceway 4 and outer race raceway 6, the impact resistance thereof is enhanced.

That is, it is an object of the invention to provide such improved ball bearing.

In attaining the above object, according to the invention, there is provided a ball bearing which comprises an inner race 5, an outer race 7 and a plurality of balls 8, 8. The inner race 5 includes on the outer peripheral surface thereof an inner race raceway 4 having an arc-shaped section. The outer race 7 includes on the inner peripheral surface thereof an outer race raceway 6 having an arc-shaped section. The plurality of balls 8, 8 are rollably interposed between the inner race raceway 4 and outer race raceway 6, and a retainer 9 for holding the balls 8, 8 in such a manner that they are able to roll freely.

Especially, according to a first aspect of the invention, there is provided a ball bearing 3, wherein the ratio $r_i/D_8$ of the radius of curvature $r_i$ of the inner race raceway 4 to the outside diameter $D_8$ of the balls 8, 8 is set in the range of 0.51~0.54 (this is, in the range from 0.51 to 0.54 with both inclusive). Also, the ratio $r_e/D_8$ of the radius of curvature of the outer race raceway 6 to the outside diameter $D_8$ of the balls 8, 8 is set in the range of 0.54~0.56 (this is, in the range from 0.54 to 0.56 with both inclusive). Further, the interior geometric clearance c is set at 13 μm or less.

By the way, the interior geometric clearance c is a value that can be obtained by subtracting the diameter $D_4$ of the inner race raceway 4 and the double of the diameter $D_8$ of the balls 8, 8 from the diameter $D_6$ of the outer race raceway 6 (that is, $D_6 - D_4 - 2D_8$). The above-mentioned value (13 μm or less) is effective especially in a miniature ball bearing in which the inside diameter $R_5$ of the inner race 5 is 2.6 mm or less, and the diameter $D_8$ of the balls 8, 8 is 2 mm or less.

Figure 2:
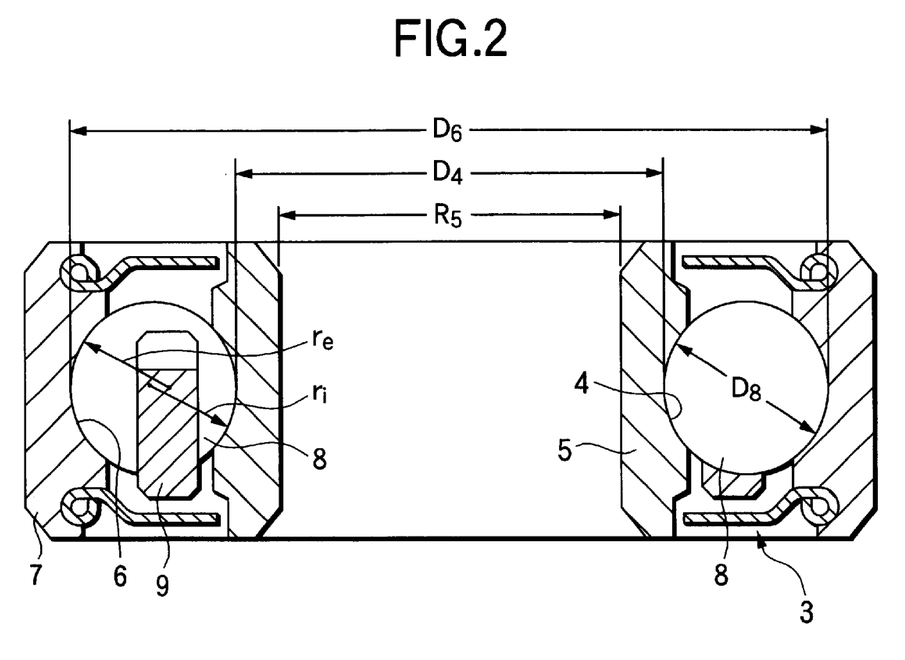
FIG. 2 is an enlarged section view of a ball bearing.

Note that in the specification, as shown in FIG. 2, the diameter $D_6$ of the outer race raceway 6 means the largest diameter of the outer race raceway 6 that is defined at the deepest position of the arc-shaped section thereof. Further, the diameter $D_4$ is the smallest diameter of the inner race raceway 4 that is defined at the deepest position of the arc-shaped section thereof.

Also, according to a second aspect of the invention, there is provided a ball bearing 3, wherein the ratio $r_i/D_8$ of the radius of curvature $r_i$ of the inner race raceway 4 to the outside diameter $D_8$ of the balls 8, 8 is set at 0.51 or more, the ratio $r_e/D_8$ of the radius of curvature $r_e$ of the outer race raceway 6 to the outside diameter $D_8$ of the balls 8, 8 is set at 0.54 or more, and these ratios $r_i/D_8$ and $r_e/D_8$ are respectively set in the range that can satisfy the relationship $(r_i/D_8)=(0.647\sim0.662)\times(r_e/D_8)^{0.385}$. (that is, these ratios $r_i/D_8$ and $r_e/D_8$ are respectively set in the range that can satisfy an equation of: $0.647\times(r_e/D_8)^{0.385}\leq(r_i/D_8)\leq0.662\times(r_e/D_8)^{0.385}$.) Further, the interior geometric clearance c is set in the range that can satisfy the relationship $0.003<(c/D_8)<0.01$.

According to the above-structure ball bearing 3 of the invention, the impact resistance thereof can be enhanced and thus, it is possible to realize compact OA equipment which, even in case where it is unexpectedly dropped down onto the floor of a building, is hard to be seriously damaged. By the way, in a ball bearing according to the prior art, since the outer race raceway 6 is concavely curved in the circumferential direction thereof, the contact ellipse existing in the contact portion between the outer race raceway 6 and balls 8, 8 becomes large and thus, in case where the edge of the contact ellipse and the edge of the outer race raceway 6 are near to each other, the contact portion is caused to reach the edge of the outer race raceway 6 due to the impact load applied to the ball bearing, so that the contact ellipse can be easily cut away.

On the other hand, in the case of a ball bearing 3 according to the first aspect of the invention, because the ratio $r_e/D_8$ of the radius of curvature $r_e$ of the outer race raceway 6 to the outside diameter $D_8$ of the balls 8, 8 is set large in the range of 0.54~0.56 and also because the interior geometric clearance c is set small, that is, 13 μm, the distance between the edge of the contact ellipse and the edge of the outer race raceway 6 is set large. Thanks to this, even in case where the impact load is applied to the ball bearing, the contact portion is made hard to reach the edge of the outer race raceway 6 and thus the contact ellipse is made hard to be cut away. On the other hand, since the inner race raceway 4 is curved projectingly with respect to the circumferential direction thereof, a contact ellipse existing in the contact portion between the inner race raceway 4 and balls 8, 8 is relatively small; but, because the ratio $r_i/D_8$ of the radius of curvature of the inner race raceway 4 to the outside diameter $D_8$ of the balls 8, 8 is set large in the range of 0.51~0.54, there can be secured the sufficient area of the contact ellipse, thereby being able to prevent the surface pressure of the contact ellipse from increasing. In this case as well, since the distance between the edge of the contact ellipse and the edge of the inner race raceway 4 can be set large because the geometric clearance c is set small, even in case where the impact load is applied to the ball bearing 3, the contact portion is made hard to reach the edge of the inner race raceway 4 and thus the contact ellipse is made hard to be cut away. Thanks to these characteristics, as described above, the impact resistance of the ball bearing 3 can be enhanced.

Also, according to the ball bearing 3 as set forth in the second aspect of the invention, the impact resistance of the ball bearing 3 can be similarly enhanced. By the way, description will be given later in detail of the process in which the ball bearing 3 according to the second aspect of the invention is developed.

Also, in the present invention, the dimensional range where the impact resistance of the ball bearing 3 according to the first aspect of the invention can be enhanced is overlapped in part with the dimensional range where the impact resistance of the ball bearing 3 according to the second aspect of the invention can be enhanced; and, the overlapped range is a more preferable range in which the impact resistance of the ball bearing 3 can be enhanced.

DETAILED DESCRIPTION OF THE PREFERRED EMBODIMENTS

Now, description will be given below of a test in accordance with which the ball bearing 3 according to the first aspect of the invention is developed with a difference between the static load rating and impact resistance taken into consideration. At the same time, description will be given below of the effects of the ball bearing 3 according to the first aspect of the invention.

Firstly, description will be given below of a test conducted on the ball bearing 3 for the relationship between the static load rating (which has been conventionally believed that, in case where it is enhanced, the impact resistance can also be enhanced accordingly) and the radiuses of curvature of the inner race raceway 4 and outer race raceway 6. In this test, as shown in the following table 1, using two kinds of test samples, that is, "a comparison example 1" which does not fall within the technical scope of the invention (the first aspect of the invention) and "an embodiment 1" falling within the technical scope of the invention (the first aspect of the invention), axial-direction static loads differing in values were applied to the two kinds of test samples to measure the harmful influences of the difference of the values of the static loads on the acoustics (G values) of the test samples.

TABLE 1

|  | Comparison Example 1 | Embodiment 1 |
|---|---|---|
| Da mm | 1.59 (1/16) | 1.59 (1/16) |
| Ratio of RI/Re | 52/53 | 51.5/56 |
| Number of balls | 8 | 7 |
| Interior Geometric Clearance | MC5 (13~20 μm) | MC4 (8~13 μm) |

In Table 1 (as well as in Table 2 which will be discussed later), reference character RI expresses the ratio $r_i/D_8$ of the radius of curvature of the inner race raceway 4 to the outside diameter $D_8$ of the balls 8, 8. Re expresses the ratio $r_e/D_8$ of the radius of curvature of the outer race raceway 6 to the outside diameter $D_8$ of the balls 8, 8 in percentage respectively. Further, MC5 expresses that the interior geometric clearance c is in the range 13~20 μm (i.e., in the range from 13 μm to 20 μm with both inclusive), while MC4 expresses that the interior geometric clearance c is in the range 8~13 μm (i.e., in the range from 8 μm to 13 μm with both inclusive).

Figure 3:
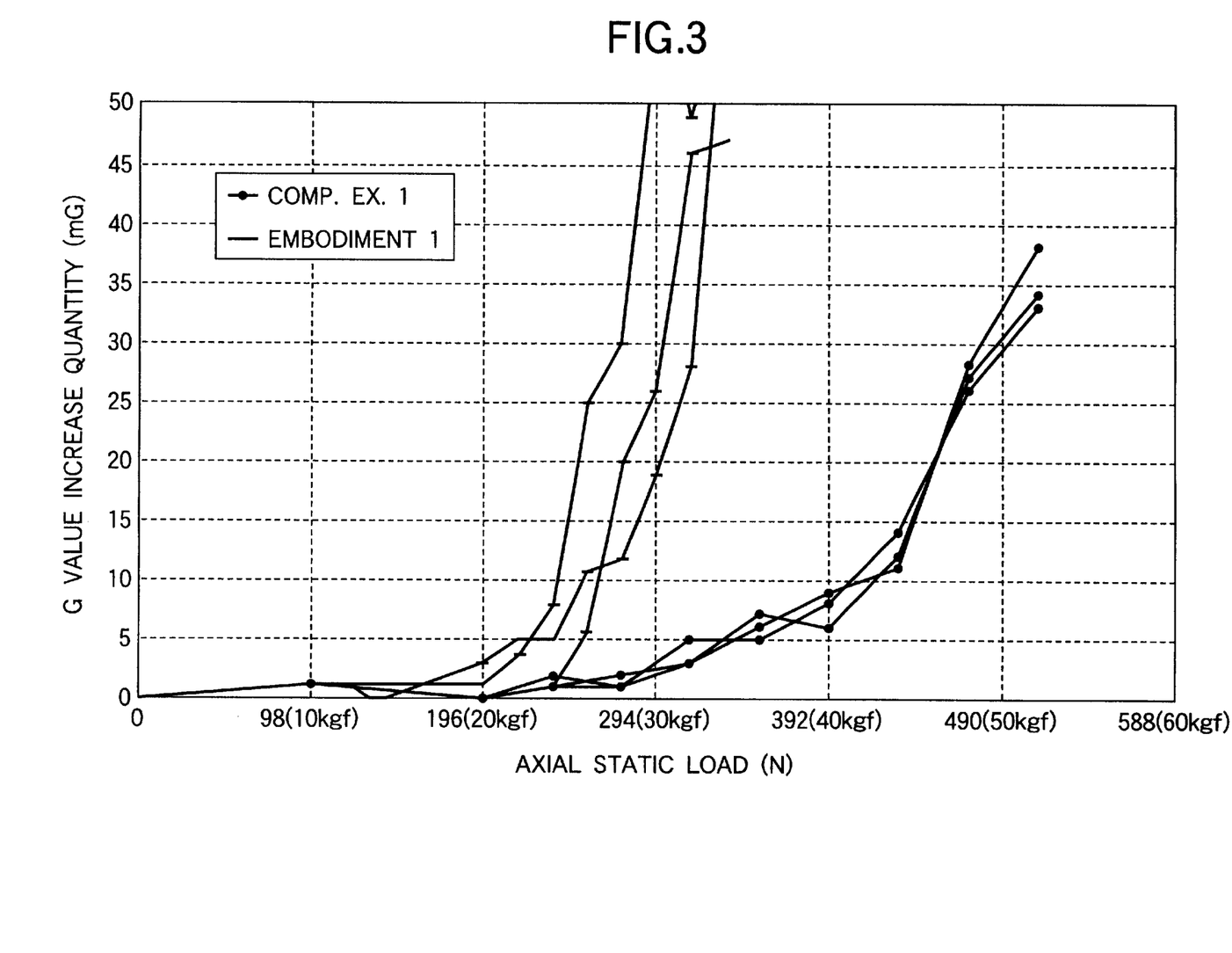
FIG. 3 is a graphical representation of the influences of the radius of curvature of the raceways of the inner and outer races of the ball bearing on the resistance of the ball bearing against static loads.

FIG. 3 shows the results of the test conducted under the above conditions. As can be seen clearly from the results of the test shown in FIG. 3, by reducing the ratios RI and Re of the radiuses of curvature of the inner race raceway 4 and the outer race raceway 6 to the outside diameter $D_8$ of the balls 8, 8, the resistance of the ball bearing 3 against the static load can be enhanced. Conventionally, it has been believed that, in case where the resistance against the static load is enhanced, the impact resistance of the ball bearing 3 can also be enhanced accordingly. By the way, in the case of the embodiment 1, when the static load exceeds 196 N (20 kgf), the acoustics of the ball bearing 3 is degraded; but, when compared with the static load that is applied to compact OA equipment, this value is far large and, therefore, it raises no practical problem.

Next, description will be given below of a test conducted in order to know the influences of the values of the ratios RI and Re of the radiuses of curvature of the inner race raceway 4 and the outer race raceway 6 to the outside diameter $D_8$ of the balls 8, 8 as well as the interior geometric clearance c on the impact resistance of the ball bearing 3. In the test, as shown in the following table 2, using five kinds of test samples, that is, "a comparison example 2", "a comparison example 3" and "a comparison example 4" which do not fall within the technical scope of the invention (the first aspect of the invention), and "an embodiment 2" and "an embodiment 3" falling within the technical scope of the invention (the first aspect of the invention), impact loads differing in values were applied to the two kinds of test samples to measure the ill deteriorate influences of the sizes of the impact loads on the acoustics (G values) of the test samples.

TABLE 2

|  | Comp. Ex. 2 | Comp. Ex. 3 | Comp. Ex. 4 | Embodiment 2 | Embodiment 3 |
|---|---|---|---|---|---|
| Da mm | 1.59 (1/16) | 1.59 (1/16) | 1.59 (1/16) | 1.59 (1/16) | 1.59 (1/16) |
| Ratio of RI/Re | 51.5/53 | 52/53 | 52/53 | 52/55 | 51.5/55 |
| Number of balls | 7 | 7 | 7 | 7 | 7 |
| Interior Geometric Clearance | MC4 | MC4 | MC4 | MC4 | MC4 |

Figure 4:
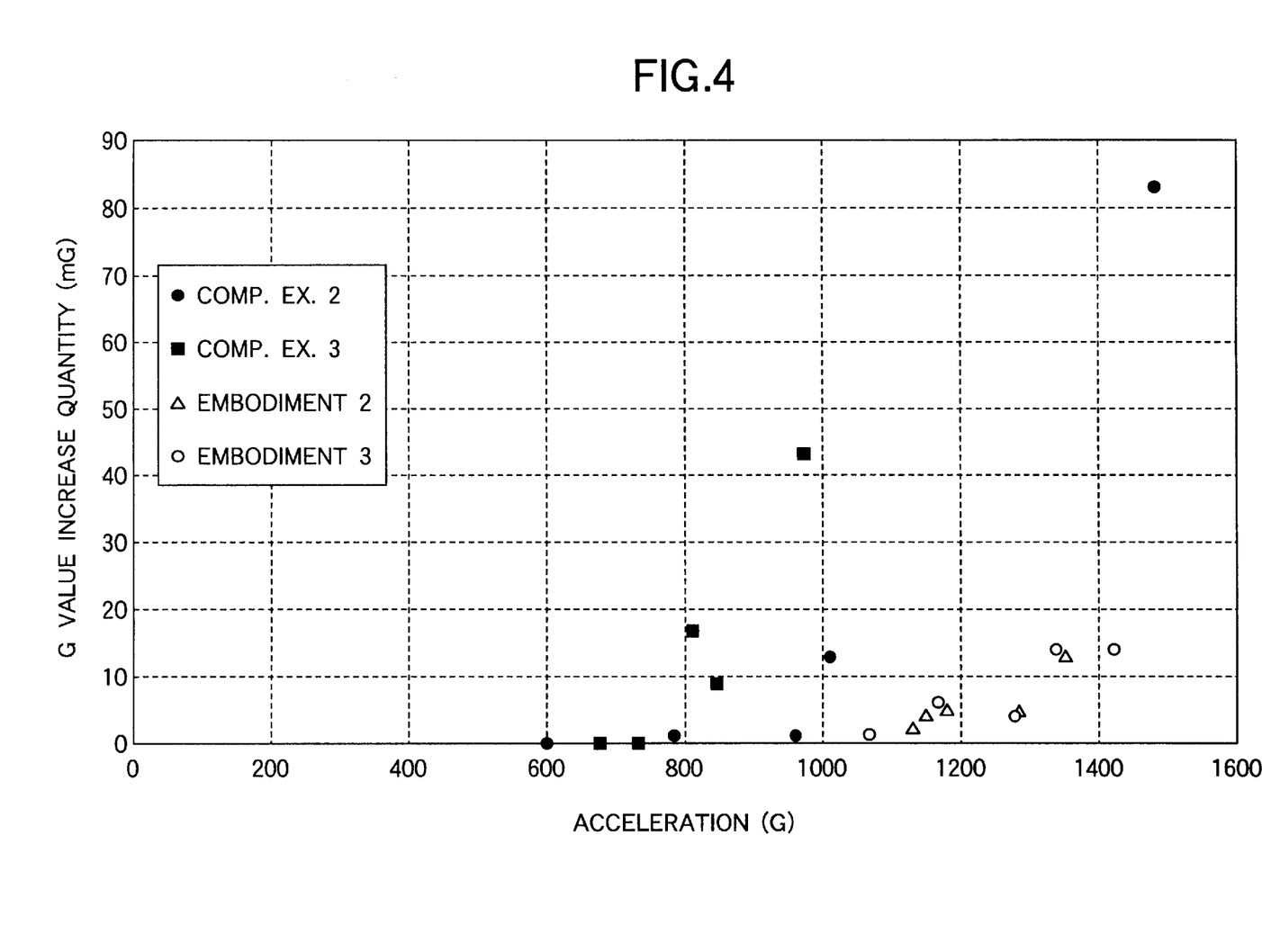
FIG. 4 is a graphical representation of the influences of the radius of curvature of the raceways of the inner and outer races of the ball bearing on the impact resistance of the ball bearing.
Figure 5:
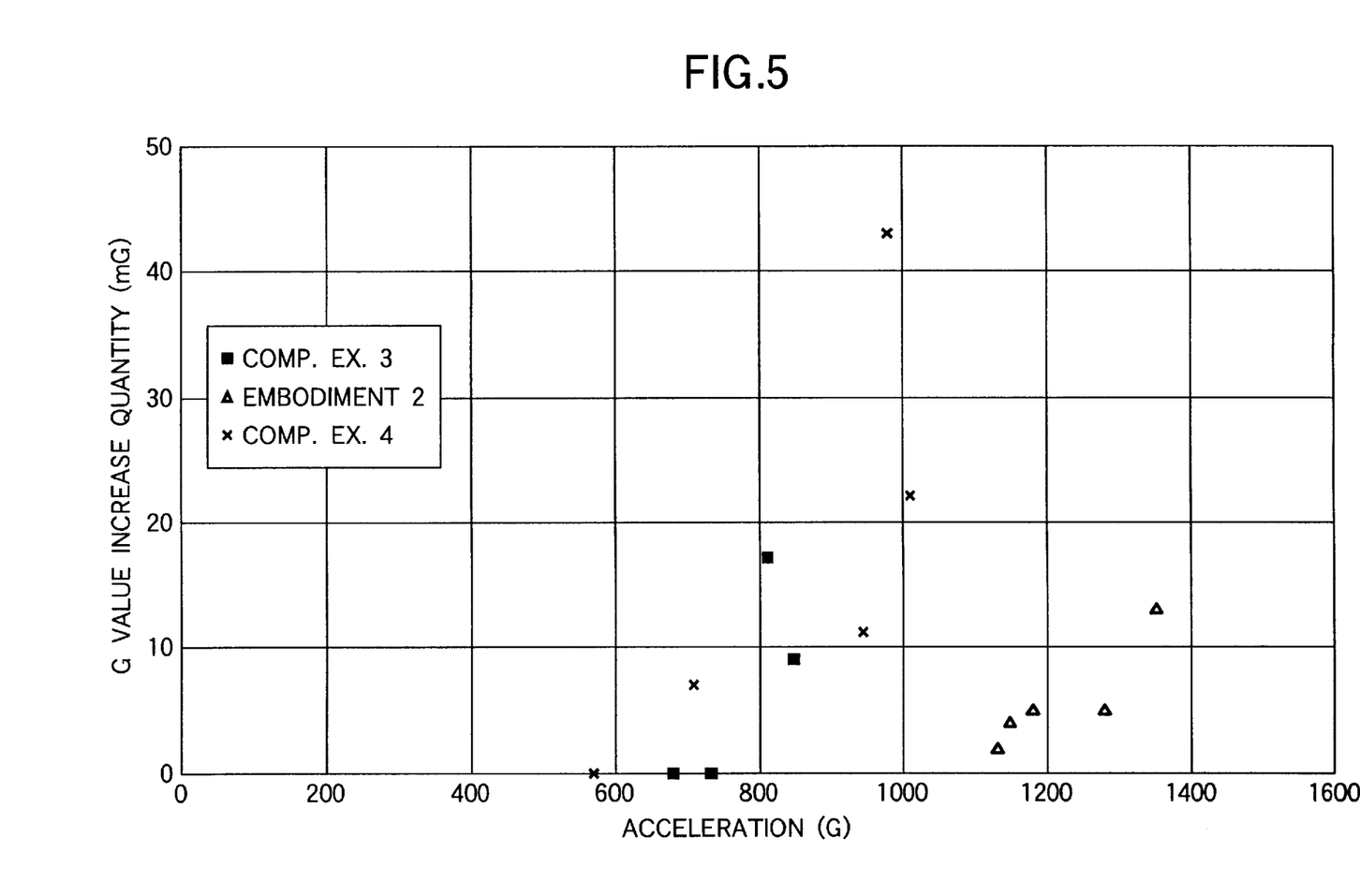
FIG. 5 is a graphical representation of the influences of the radius of curvature of the raceways of the inner and outer races of the ball bearing and the interior geometric clearance of the ball bearing on the impact resistance of the ball bearing.

The test was conducted under the above conditions. FIGS. 4 and 5 respectively show the results of the test conducted in order to know the influences of the impact loads. Of these two figures, FIG. 4 shows the comparison results of the comparison examples 2, 3 and embodiments 2, 3 and, from FIG. 4, we can know the influences of the ratio Re of the radius of curvature of the outer race raceway 6 to the outside diameter $D_8$ of the balls 8, 8 on the impact resistance of the ball bearing 3. That is, it can be found from FIG. 4 that, in case where the interior geometric clearance c is small, by increasing the ratio Re, the impact resistance of the ball bearing 3 can be enhanced. Also, FIG. 5 shows the comparison results of the comparison examples 3, 4 and embodiment 2 and, from FIG. 5, we can know the influence of the interior geometric clearance c on the impact resistance of the ball bearing 3. That is, it can be found from FIG. 5 that, simply by reducing the interior geometric clearance c, the impact resistance of the ball bearing 3 cannot be enhanced but, by increasing the ratio Re and by reducing the interior geometric clearance c, the impact resistance of the ball bearing 3 can be enhanced greatly.

Next, description will be given below of a process and a test in accordance with which the ball bearing 3 according to the second aspect of the invention is developed. And, at the same time, description will be given below of the effects of the ball bearing 3 according to the second aspect of the invention.

As described above, conventionally, it has been believed that the impact resistance of the ball bearing 3 can be enhanced together with the resistance of the ball bearing 3 against the static load. For this reason, when designing the ball bearing 3 in such a manner that the impact resistance of the ball bearing 3 can be enhanced, the impact load to be carried by the ball bearing 3 was converted to a static load equivalent to the impact load and the dimensions of the respective parts of the ball bearing 3 were restricted such that the ball bearing 3 can stand against the static load. Also, in this case, for example, the axial-direction impact load to be applied to the ball bearing 3 was converted as a pure axial load (a static load including only the axial-direction component) to be applied to the ball bearing 3.

However, in case where the ball bearing 3 is assembled to the rotation support portion of the HDD, due to the manufacturing error of the ball bearing 3 and its assembling error to the HDD rotation support portion, the center axis of the inner race 5 and the center axis of the outer race 7 are often inclined with respect to each other slightly. Therefore, in case where the axial-direction impact load is applied to the ball bearing 3 in its actually assembled state, in most cases, not only the axial-direction static load (converted load) but also the radial-direction static load (converted load) are applied to the ball bearing 3. That is, in case where the axial-direction impact load to be applied to the ball bearing 3 is converted as a pure axial load to be applied to the ball bearing 3, it is impossible to design the strength that is suitable for the actual load condition. From this point of view as well, it can be well said that the strength design of the ball bearing based on the above conversion of the impact load to the static load, in most case, is not suitable for the actual load condition.

In view of the above, in order to be able to make a strength design that is suitable for the actual load condition, the present inventors obtained the load that is applied to the ball bearing 3 in case where the center axes of the inner and outer races 5 and 7 are inclined with respect to each other (that is, there exists a misalignment between them), using a computer analysis. And, based on this computer analysis, there were found the proper ranges of the radiuses of curvature $r_i$, $r_e$ of the inner race and outer race raceways 4, 6 and the interior geometric clearance c that can realize a ball bearing 3 having high impact resistance. Now, description will be given below of the contents of the computer analysis.

The computer analysis was made on such ball bearing 3 as shown in FIG. 2 in which the pitch circle diameter (p.c.d.) of the balls 8, 8 is 6.3 mm, the diameter $D_8$ of the balls 8, 8 is 1.588 mm, and the total number of the balls 8, 8 is 7. Also, all of the following analyses were made under the condition that, while the outer race 7 of the ball bearing 3 was being fixed, a impact having an initial speed of 0.15 m/s was applied to the inner race 5 of the ball bearing 3. Further, in the following computer analyses, in case where a plurality of test samples are discussed, the remaining specifications of the ball bearing 3 are the same in the respective test samples unless they are otherwise specified.

Figure 6:
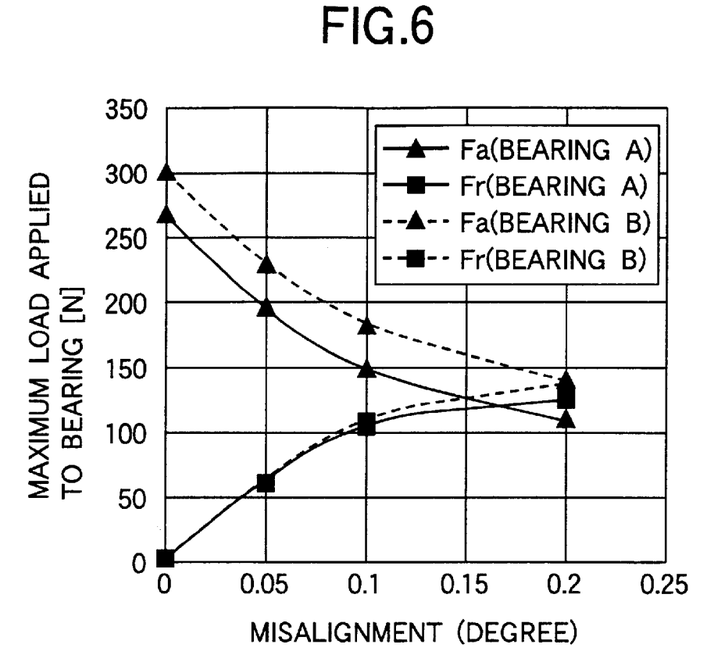
FIG. 6 is a graphical representation of the influences of the mutual inclination quantity (misalignment) between the center axes of the inner and outer races of the ball bearing and the interior geometric clearance of the ball bearing on axial and radial loads applied to the ball bearing.

In the analysis test, firstly, there were analyzed the influences of the value of the interior geometric clearance c of the ball bearing 3 and the quantity of the relative inclination (misalignment) between the center axes of the inner and outer races 5, 7 on the axial load $F_a$ and radial load $F_r$ respectively applied to the ball bearing 3 based on the above-mentioned axial-direction impact. In this analysis test, there were used, as test samples, a ball bearing 3 (bearing A) having an interior geometric clearance c of 11 µm and ball bearing 3 (bearing B) having an interior geometric clearance c of 17 µm and, in these two bearings A and B, the values of the above misalignment were varied variously; and, the axial loads $F_a$ and radial loads $F_r$ applied to these bearings A and B were found using numerical calculation. FIG. 6 shows the results of these analyses.

As can be seen clearly from the analysis results shown in FIG. 6, in the case of the misalignment of 0, only the axial loads $F_a$ are applied to the respective bearings A and B. However, in case where a misalignment occurs, not only the axial loads $F_a$ but also the radial loads $F_r$ are applied to the respective bearings A and B. In addition, as the misalignment increases, a percentage of application of the axial loads $F_a$ decreases, whereas a percentage of application of the radial loads $F_r$ increases.

Also, the axial loads $F_a$ and radial loads $F_r$, which are applied to the ball bearing 3, are smaller in the bearing A having a small interior geometric clearance c than in the bearing B having a large interior geometric clearance c. The reason for this is that the present analysis is a dynamic analysis in which the shock/impact is applied to the inner race 5 in the above-mentioned manner, that is, the bearing A having a small interior geometric clearance c is smaller in the contact angle than the bearing B having a large interior geometric clearance c. In other words, the reason is that, as the contact angle of the ball bearing decreases in this manner, the rigidity of the ball bearing decreases to thereby reduce the impact loads to be applied to the contact portions between the rolling surfaces of the balls 8, 8 and inner and outer race raceways 4, 6. Therefore, it can be found that, in order to enhance the impact resistance of the ball bearing 3, preferably, the interior geometric clearance c of the ball bearing 3 may be reduced.

Figure 7:
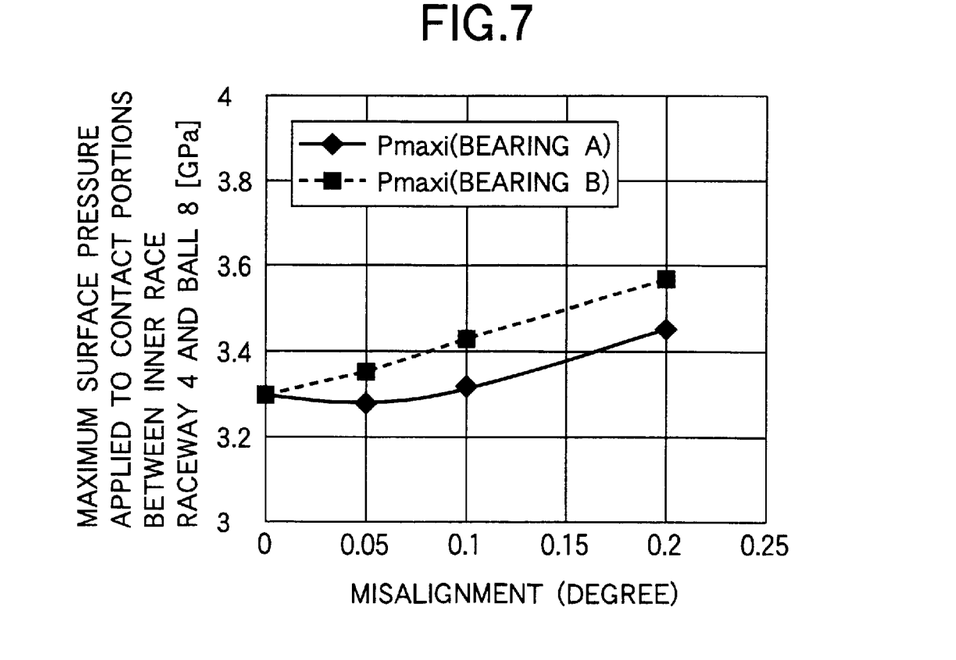
FIG. 7 is a graphical representation of the influences of the mutual inclination quantity (misalignment) between the center axes of the inner and outer races of the ball bearing and the interior geometric clearance of the ball bearing on the maximum surface pressure applied to the inner race raceway.

Next, there were analyzed the influences of the value of the interior geometric clearance c of the ball bearing 3 and the value of the above-mentioned misalignment on the maximum surface pressure $P_{maxi}$ that is applied to the contact portions between the rolling surfaces of the balls 8, 8 and inner race raceways 4 based on the above-mentioned axial-direction impact load. In this analysis test, there were used, as test samples, the above-mentioned bearings A and B and, in these two bearings A and B, the values of the above misalignment were varied variously; and, the maximum surface pressure $P_{maxi}$ was found using numerical calculation. FIG. 7 shows the results of this analysis test.

As can be seen clearly from the analysis results shown in FIG. 7, in the case of the misalignment of 0, the bearing A having a small interior geometric clearance c and the bearing B having a large interior geometric clearance c are equal to each other in the maximum surface pressure $P_{maxi}$ to be applied to the above contact portions. On the other hand, in case where the misalignment increases, the bearing B having a large interior geometric clearance c increases in the maximum surface pressure $P_{maxi}$ to be applied to the above contact portions over the bearing A having a small interior geometric clearance c. Therefore, it can be found from the analysis results shown in FIG. 7 as well that, in order to enhance the impact resistance of the ball bearing 3, preferably, the interior geometric clearance c of the ball bearing 3 may be reduced.

By the way, the analysis results shown in FIGS. 6 and 7 cannot be obtained according to a conventional static analysis. Namely, in the conventional static analysis, it was believed that, in case where the interior geometric clearance c of the ball bearing 3 is set large (that is, the contact angle of the bearing is set large), the load resistance (static load rating) of the ball bearing 3 can be increased and, therefore, by increasing the interior geometric clearance c, the impact resistance of the ball bearing 3 can also be increased.

Next, in case where there exists a misalignment in the ball bearing 3, there were analyzed the influences of the ratio $r_e/D_8$ of radius of curvature $r_e$ of the outer race raceway 6 forming the present ball bearing 3 to the outside diameter $D_8$ of the balls 8, 8 of the present ball bearing 3 on the maximum surface pressure $P_{maxe}$ to be applied to the contact portions between the outer race raceway 6 and the rolling surfaces of the balls 8, 8 as well as on the maximum surface pressure $P_{maxi}$ to be applied to the contact portions between the inner race raceway 4 and the rolling surfaces of the balls 8, 8. Specifically, in the preset analysis, in the ball bearing 3 (one unit) having a misalignment of 0.1 degree, while varying the ratio $r_e/D_8$ variously, the maximum surface pressures $P_{maxe}$ and $P_{maxi}$ applied to the respective contact portions were found using numeric calculation. By the way, in this analysis, the ratio $r_i/D_8$ of the radius of curvature $r_i$ of the inner race raceway 4 forming the present ball bearing 3 to the outside diameter $D_8$ of the balls 8, 8 was set at 0.516, while the interior geometric clearance c was set at 13 μm. And, FIG. 8 shows the results of this analysis.

In order to enhance the impact resistance of the ball bearing 3, preferably, the difference between the maximum surface pressures $P_{maxe}$ and $P_{maxi}$ to be applied to the respective contact portions may be reduced as much as possible (that is, these two maximum surface pressures may be made substantially equal to each other). The reason for this is to prevent the surface pressure of any one of the contact portions from increasing excessively and thus to prevent the present contact portion against damage. With respect to this, according to the analysis results shown in FIG. 8, it can be found that, in case where the ratio $r_e/D_8$ is set on the order of 0.542, the maximum surface pressures $P_{maxe}$ and $P_{maxi}$ to be applied to the respective contact portions can be made substantially equal to each other.

Figure 8:
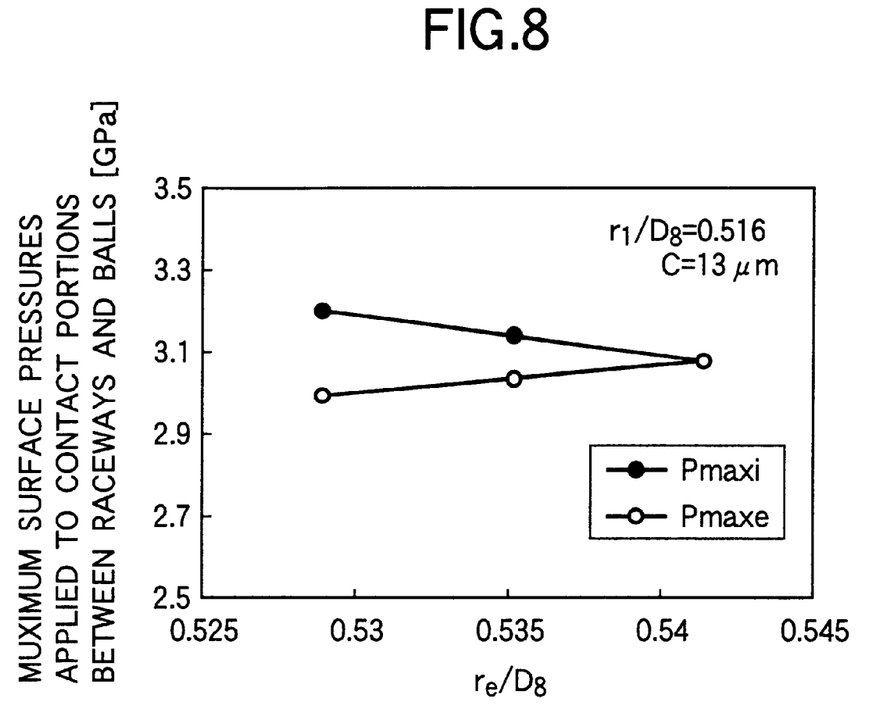
FIG. 8 is a graphical representation of the influences of the radius of curvature of the raceways of the inner and outer races of the ball bearing on the maximum surface pressures applied to the race raceways of the inner and outer races.
Figure 9:
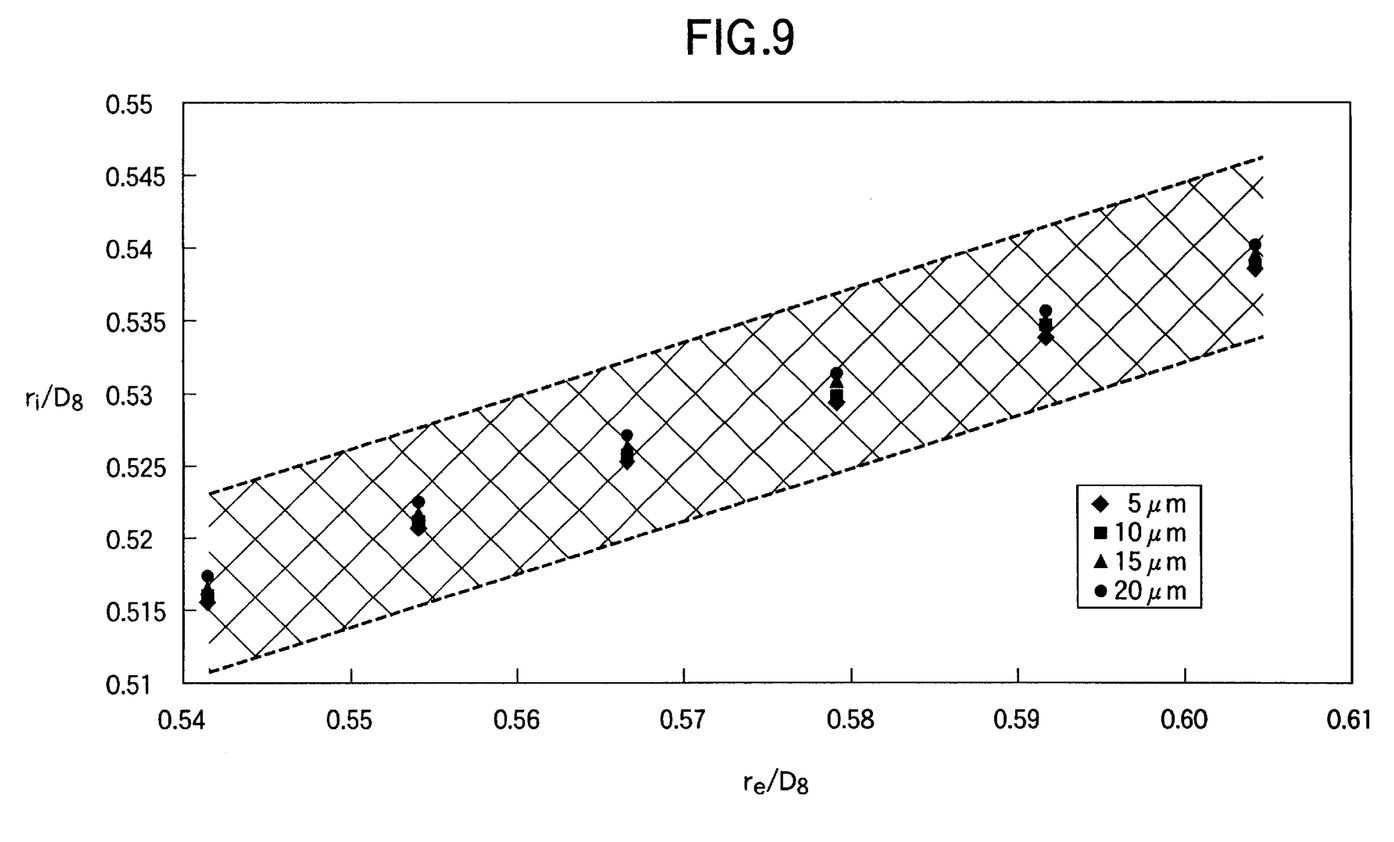
FIG. 9 is a graphical representation of the relationship between the ratios of the radiuses of curvature of the raceways of the inner and outer races to the diameter of balls, which can equalize the maximum surface pressures applied to the inner and outer races.

Next, in order to generalize the analysis results shown in FIG. 8, the relationship between the two ratios $r_e/D_8$ and $r_i/D_8$, which can equalize the maximum surface pressures $P_{maxe}$ and $P_{maxi}$ to be applied to the respective contact portions, was analyzed. In this analysis, as test samples, there were employed four ball bearings 3 respectively having a misalignment of 0.1 degree and having different internal geometric clearances c (specifically, c=5, 10, 15, 20 μm); and, the values of the two ratios $r_e/D_8$ and $r_i/D_8$, which can equalize the maximum surface pressures $P_{maxe}$ and $P_{maxi}$ to be applied to the respective contact portions, were found using numeric calculation. FIG. 9 shows the results of this analysis.

As can be seen clearly from the analysis results shown in FIG. 9, the values of (the relationship between) the two ratios $r_e/D_8$ and $r_i/D_8$, which can equalize the maximum surface pressures $P_{maxe}$ and $P_{maxi}$ to be applied to the respective contact portions, are substantially constant regardless of the values of the internal geometric clearances c of the ball bearings 3. Therefore, in order to enhance the impact resistance of the ball bearing 3, the values of (the relationship between) the two ratios $r_e/D_8$ and $r_i/D_8$, preferably, may be decided in the range shown by diagonal lattices in FIG. 9, that is, in the range that satisfies the relationship $(r_i/D_8)=(0.647\sim0.662)\times(r_e/D_8)^{0.385}$, with the manufacturing error of the ball bearing 3 taken into consideration.

By the way, in case where the two ratios $r_e/D_8$ and $r_i/D_8$ are reduced excessively, the contact ellipses formed in the contact portions between the raceways 4, 6 of the inner and outer races and the rolling surfaces of the balls 8, 8 are easy to run up onto the shoulders of these respective raceways 4, 6, thereby raising an inconvenience that an excessive surface pressure based on an edge load can be applied to the contact portion. For prevention of such inconvenience, preferably, the above-mentioned two ratios $r_e/D_8$ and $r_i/D_8$ may be set 0.51 or more respectively. Therefore, with the range shown by diagonal lattices in FIG. 9 (the range that satisfies the above-mentioned relationship) taken into consideration, in the long run, preferably, the lower limit value of the ratio $r_i/D_8$ may be set at 0.51 and the lower limit value of ratio $r_e/D_8$ may be set at 0.54.

Figure 10:
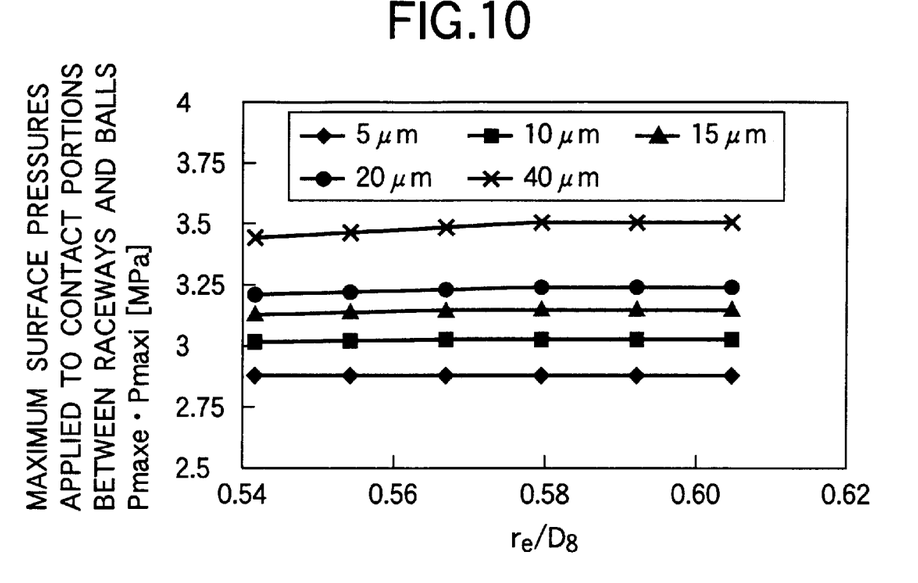
FIG. 10 is a graphical representation of the influences of the radius of curvature of the raceways of the inner and outer races of the ball bearing and the interior geometric clearance of the ball bearing on the maximum surface pressures applied to the raceways; and, FIG. 11 is a graphical representation of the influences of the interior geometric clearance of the ball bearing on the maximum surface pressures applied to the raceways.

Next, FIG. 10 shows, in the ball bearings 3 including not only the ball bearings having the specifications plotted in FIG. 9 but also a ball bearing 3 having an interior geometric clearance c of 40 μm, the relationship between the above ratio $r_e/D_8$ (the ratio $r_e/D_8$ that can make $P_{maxi}=P_{maxe}$) and the maximum surface pressures $P_{maxi}$, $P_{maxe}$ ($P_{maxi}=P_{maxe}$) which are applied to the respective contact portions between the raceways 4, 6 of the inner and outer races of the ball bearings 3 and the rolling surfaces of the rolling bodies 8, 8 of the ball bearings 3.

As can be seen clearly from the analysis results shown in FIG. 10, in case where the relationship between the two ratios $r_e/D_8$ and $r_i/D_8$ is proper as in the ball bearings having the specifications plotted in FIG. 9, the values of the maximum surface pressures $P_{maxi}$, $P_{maxe}$ ($P_{maxi}=P_{maxe}$) to be applied to the respective contact portions can be made substantially constant regardless of the values of the ratio $r_e/D_8$ (and thus, regardless of the values of the ratio $r_i/D_8$). On the other hand, in case where the interior geometric clearances c of the ball bearings 3 are different, the values of the maximum surface pressures $P_{maxi}$, $P_{maxe}$ ($P_{maxi}=P_{maxe}$) applied to the respective contact portions are different.

Figure 11:
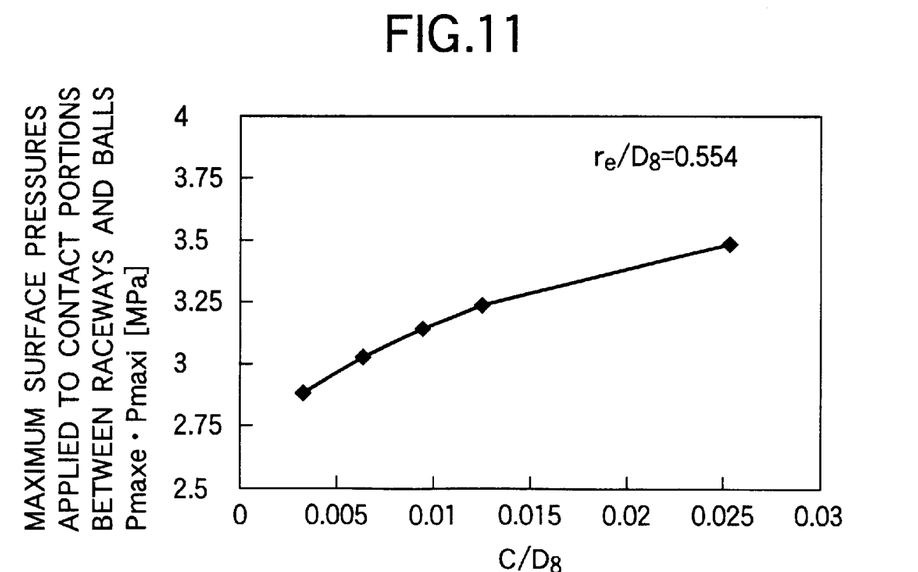

Thus, the inventors have made another analysis to know the range of the interior geometric clearance c that can sufficiently reduce the maximum surface pressures $P_{maxi}$, $P_{maxe}$ ($P_{maxi}=P_{maxe}$) to be applied to the respective contact portions. FIG. 11 shows the relationship between the interior geometric clearances c (which are expressed as the ratio $c/D_8$) of the ball bearings 3 having the above-mentioned specifications when the ratio $r_e/D_8$ is 0.554 in connection with the analysis results shown in FIG. 10.

As can be seen clearly from the analysis results shown in FIG. 11, in case where the ratio $c/D_8$ is less than 0.01, the maximum surface pressures $P_{maxi}$, $P_{maxe}$ to be applied to the respective contact portions decrease suddenly. On the other hand, in case where the ratio $c/D_8$ is excessively large, it is difficult to assemble to the ball bearing 3. Therefore, in order to enhance the impact resistance of the ball bearing 3 with the assembly of the ball bearing 3 taken into consideration, preferably, the ratio $c/D_8$ may be decided in the range of $0.003<(c/D_8)<0.010$.

Summing up the results of the analyses described hereinabove, in order to be able to enhance the impact resistance of the ball bearing 3, there may be produced a ball bearing 3 having the following specifications: that is, the ratio $r_i/D_8$ of the radius of curvature $r_i$ of the inner race raceway 4 forming the present ball bearing 3 to the outside diameter $D_8$ of the balls 8 is 0.51 or more; the ratio $r_e/D_8$ of radius of curvature $r_e$ of the outer race raceway 6 forming the present ball bearing 3 to the outside diameter $D_8$ of the balls 8, 8 is 0.54 or more; the two ratios $r_e/D_8$ and $r_i/D_8$ are present in the range that satisfies the relationship $(r_i/D_8)=(0.647\sim0.662)\times(r_e/D_8)^{0.385}$; and, the interior geometric clearance c is present in the range that satisfies the relationship $0.003<(c/D_8)<0.010$.

By the way, in the present invention, the dimension range that can enhance the impact resistance of the ball bearing 3 as set forth in the first aspect of the invention is overlapped in part with the dimension range that can enhance the impact resistance of the ball bearing 3 as set forth in the second aspect of the invention. And, the overlapped dimension range is a more preferable dimension range that can enhance the impact resistance of the ball bearing 3.

According to the invention, as has been described heretofore, the impact resistance of the ball bearing 3 can be enhanced from an entirely different viewpoint from the conventional concept. And, the invention is able to contribute greatly for enhancing the reliability and durability of compact OA equipment such as a personal computer.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A ball bearing, comprising:

an inner race including on the outer peripheral surface thereof an inner race raceway having an arc-shaped section;

an outer race including on the inner peripheral surface thereof an outer race raceway having an arc-shaped section;

a plurality of balls rollably interposed between said inner race raceway and said outer race raceway; and, a retainer for rotatably holding said balls;

wherein the ratio $r_i/D_8$ of the radius of curvature $r_i$ of said inner race raceway to the outside diameter $D_8$ of said balls is set in the range from 0.51 to 0.54, the ratio $r_e/D_8$ of the radius of curvature $r_e$ of said outer race raceway to the outside diameter $D_8$ of said balls is set in the range from 0.54 to 0.56, and an interior geometric clearance c is set at 13 μm or less, said interior geometric clearance c being a value satisfying an equation of: $c=D_6-D_4-2D_8$, where $D_4$ is the diameter of the inner race raceway, $D_8$ is the outside diameter of the balls, and $D_6$ is the diameter of the outer race raceway.

2. The ball bearing according to claim 1, wherein the inside diameter $R_5$ of the inner race is 2.6 mm or less, and the outside diameter $D_8$ of said balls is 2 mm or less.

3. A ball bearing, comprising:

an inner race including on the outer peripheral surface thereof an inner race raceway having an arc-shaped section;

an outer race including on the inner peripheral surface thereof an outer race raceway having an arc-shaped section;

a plurality of balls rollably interposed between said inner race raceway and said outer race raceway; and, a retainer for rotatably holding said balls;

wherein the ratio $r_i/D_8$ of the radius of curvature $r_i$ of said inner race raceway to the outside diameter $D_8$ of said balls is set at 0.51 or more, the ratio $r_e/D_8$ of the radius of curvature $r_e$ of said outer race raceway to the outside diameter $D_8$ of said balls is set at 0.54 or more, said ratios $r_i/D_8$ and $r_e/D_8$ are respectively set in the range that can satisfy an equation of:

$$0.647 \times (r_e/D_8)^{0.385} \leq (r_i/D_8) \leq 0.662 \times (r_e/D_8)^{0.385},$$

where $r_i$ is the radius of curvature of said inner race raceway, $r_e$ is the radius of curvature of said outer race raceway, and $D_8$ is the outside diameter of the balls, and an interior geometric clearance c is set in the range that can satisfy the relationship $0.003<(c/D_8)<0.01$, said interior geometric clearance c being a value satisfying an equation of:

$$c=D_6-D_4-2D_8,$$

where $D_6$ is the diameter of the outer race raceway, $D_4$ is the diameter of the inner race raceway, and $D_8$ is the outside diameter of the balls.

* * * * *